United States Patent [19]

Van Maanen

[11] Patent Number: 5,013,289
[45] Date of Patent: May 7, 1991

[54] POWER TRANSMISSION

[75] Inventor: Keith D. Van Maanen, Berkley, Mich.

[73] Assignee: General Motors Corporation, Detroit, Mich.

[21] Appl. No.: 482,132

[22] Filed: Feb. 20, 1990

[51] Int. Cl.⁵ .............................................. F16H 37/06
[52] U.S. Cl. ..................................... 475/286; 475/218; 475/219; 475/290; 475/302; 475/330
[58] Field of Search ............... 475/286, 290, 296, 302, 475/317, 323, 329, 330, 218, 219

[56] References Cited

U.S. PATENT DOCUMENTS 3,915,033 10/1975 Polak ............................... 475/286 X
4,046,031 9/1977 Ott et al. .......................... 475/286 X
4,614,133 9/1986 Nerstad et al. ................... 475/219 X

FOREIGN PATENT DOCUMENTS 52-11362 1/1977 Japan ................................... 475/218
1020266 5/1983 U.S.S.R. .............................. 475/219

Primary Examiner—Allan D. Herrmann
Assistant Examiner—Benjamin Levi
Attorney, Agent, or Firm—Donald F. Scherer

[57] ABSTRACT

A power transmission has three countershaft gear sets which provide selective input members for a pair of interconnected simply planetary gear arrangements. The planetary gear arrangements have the sun gears interconnected, a ring gear and a carrier interconnected, another carrier connected with a transmission output shaft and another ring gear connected with one of the transfer gear sets. The other two transfer gear sets are connected with respective ones of the interconnected members. A plurality of selectively engageable clutches and brakes are arranged to establish input and reaction members for the planetary gear arrangement to provide six forward speed ratios and one reverse speed ratio.

3 Claims, 2 Drawing Sheets

1

POWER TRANSMISSION

BACKGROUND OF THE INVENTION

This invention relates to power transmissions and more particularly to such transmissions wherein a plurality of speed ratios are selectively established between the transmission input and output members. Specifically, the present invention relates to multispeed power transmissions wherein both a countershaft type gearing and planetary type gears are combined.

SUMMARY OF THE INVENTION

The present invention provides a compact multispeed gearing assembly for use in a vehicle drive arrangement. The gearing combines a countershaft portion rotatably supported on parallel axes and a planetary gear portion rotatably supported on one of the parallel axes with the transfer gear members and the planetary gear portion being disposed in an axially extending envelope enclosing the parallel shafts.

The planetary gear portion is disposed along an axis and has an axial length disposition parallel with and shorter than the axial disposition of the transfer gears. This arrangement results in a short overall axial length of the transmission.

With the use of countershaft gearing arrangement of the present invention, it is possible to provide three input members for the planetary gear portion. By judiciously interconnecting the members of the planetary gear portion, it is possible to provide six forward speed ratios with five friction devices, two simple planetary gear sets and three transfer gear sets. The friction devices are comprised of three clutches and two brakes. The two simple planetary gear sets have the sun gears interconnected and the ring gear of one set connected to the carrier of the other set. The remaining members, ring gear and carrier, are connected to a transfer gear and a transmission output member, respectively. The remaining two transfer gear sets are drivingly connected with respective ones of the interconnected planetary members.

It is therefore an object of this invention to provide an improved power transmission having the transfer gear members for selectively providing a plurality of input drive paths to at least three members of two interconnected simple planetary gear arrangements.

It is another object of this invention to provide an improved power transmission, wherein three transfer gear sets and two interconnected simple planetary gear sets are controlled by five selectively engageable friction devices to establish six forward speed ratios and one reverse speed ratio.

It is a further object of this invention to provide an improved power transmission having three transfer gear input ratios selectively connectable with the transmission input through three friction clutches and wherein, two interconnected simple planetary gear sets having interconnected input members, interconnected input and reaction members, a single input and reaction member, an output member and two selectively operable brake members are effective in combination with the transfer gear inputs to establish six forward drive ratios and a reverse drive ratio between the transmission input and output shafts.

These and other objects and advantages of the present invention will be more readily apparent from the following description and drawings.

DESCRIPTION OF THE EXEMPLARY EMBODIMENT

Figures 1, 3:
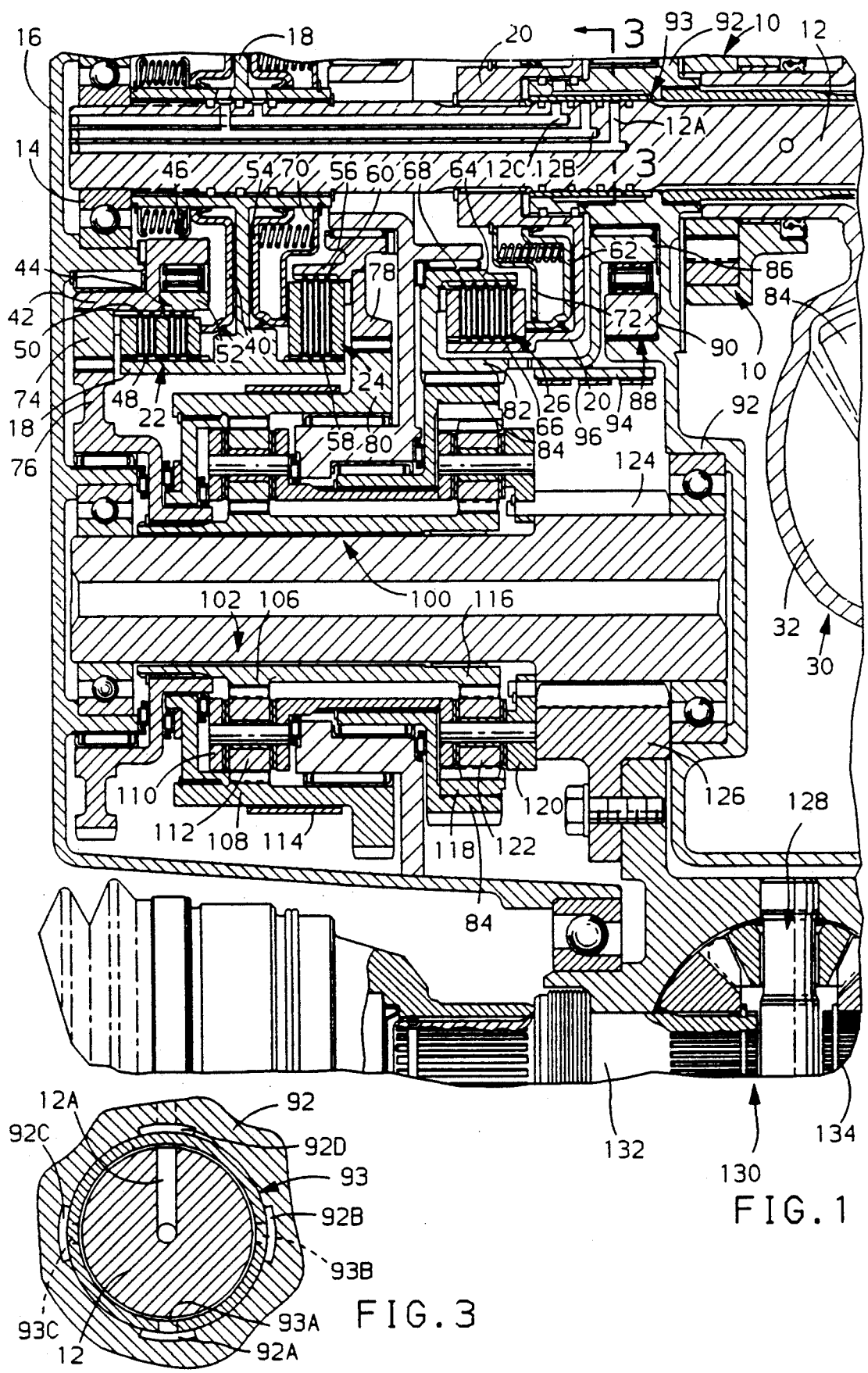
FIG. 1 is a sectional elevational view of a portion of a transmission depicting an exemplary embodiment of the invention.
FIG. 3 is a sectional view taken along line 3—3 of FIG. 1.

Referring to the drawings, wherein like characters represent the same or corresponding parts throughout the views, there is seen in FIG. 1 a transmission arrangement 10 having an input shaft 12, which is rotatable supported on a bearing 14 in a portion of a transmission housing 16. The input shaft 12 has drivingly connected therewith a pair of clutch housings 18 and 20.

The clutch housing 18 houses a first clutch assembly, generally designated 22, and a second clutch assembly, generally designated 24. The clutch housing 20 houses a third clutch assembly, generally designated 26. The transmission input shaft 12 is drivingly connected with a torque converter turbine 28 which is a component within a convention torque converter and clutch arrangement 30. The torque converter 30 also has an impeller 32, a stator 34 and a selectively engageable friction clutch 36. The impeller 32 is drivingly connected to a power input shaft 38 which is also selectively engaged by the clutch 36. The power input shaft 38 is driven by a prime mover, not shown.

The first clutch assembly 22 includes a selective fluid operated piston 40, a hub member 42, an outer race 44 of a one-way member 46, and a plurality of friction discs 48, 50 and 52 which are connected with the clutch housing 18, hub 42 and outer race 44, respectively.

The hub 42 provides the inner race for the one-way device 46. The one-way device 46 provides a directional sensitive torque capacity for the clutch 22. As will become apparent during the description of the operation of the present invention, the clutch 22 is engaged for four of the six forward drive ratios and during the ratio interchange between the fourth and fifth ratios, a torque reversal will occur. To assist in shift interchange timing at this point, the one-way device 46 significantly reduces the torque capacity of the first clutch 22.

The second clutch assembly 24 includes a fluid operated piston 54, an inner hub 56 and a plurality of friction devices 58 and 60, alternately spaced and interconnected between the clutch housing 18 and the hub 56, respectively. The third clutch assembly 26 includes a fluid operated piston 62, an inner hub 64 and a plurality of friction discs 66 and 68, alternately spaced and interconnected between the housing 20 and the inner hub 64, respectively. The clutch pistons 54 and 62 have respective dam members 70 and 72 which cooperate with the pistons 54 and 62 to prevent centrifugal drift-on of the clutch assemblies 24 and 26. The use of such devices are well known. The piston 40 can incorporate a ball dump valve to prevent centrifugal drift-on if desired.

The hub 42 of clutch assembly 22 has secured thereto an input transfer gear 74 which, in turn, meshes with an output transfer gear 76. The hub 56 has secured thereto an input transfer gear 78 which, in turn, meshes with an output transfer gear 80. The hub 64 has secured thereto an input transfer gear 82 which, in turn, meshes with an output transfer gear 84. Also secured to the hub 64 is an inner race 86 for a one-way brake device 88 which has an outer race 90 secured to a transmission case portion 92. The hub 64 also has a brake drum 94 secured thereto. The brake drum 94 cooperates with a conventional single or multiwrap brake band 96 which is selectively operable to maintain the transfer gear pair 82, 84 stationary.

The shaft 12 is rotatably supported in a bushing 93 which is secured in the housing 92 and has formed therein a plurality of passages 93b and 93c which communicate with fluid passages 12b and 12c, respectively, in the shaft 12 and grooves 92b and 92c, respectively, in the housing 92. The grooves 92b and 92c are selectively connected with pressurized fluid supplied by a conventional hydraulic control system to thereby selectively engage the clutches 22 and 24, respectively. Grove 92d is pressurized to engage the clutch 26 and groove 92a is supplied with lubrication fluid that is distributed through opening 93a and passage 12a.

The transmission 10 also includes a planetary gear arrangement, generally designated 100, which incorporates a pair of simple planetary gear sets 102 and 104. The planetary gear set 102 includes a sun gear 106, a ring gear 108 and a planetary carrier 110. A plurality of pinion gears 112 are rotatably supported on the carrier 110 in meshing relation with the sun gear 106 and the ring gear 108. The sun gear 106 is drivingly connected with the transfer gear 76 and the ring gear 108 is drivingly connected with the transfer gear 80. A conventional band brake 114 is disposed adjacent the outer surface of the ring gear 108 and is selectively engaged to restrain rotation of the ring gear 108.

The planetary gear set 104 includes a sun gear 116, a ring gear 118 and a planetary carrier 120 on which is rotatably supported a plurality of pinion gears 122 which are disposed in meshing relation with the sun gear 116 and the ring gear 118. The sun gear 116 is formed integral with or otherwise secured to the sun gear 106. The ring gear 118 is drivingly connected with the carrier 110 and the transfer gear 84. The carrier 120 is drivingly connected with an output transfer gear 124. The output transfer gear 124 meshes with a transfer gear 126 which, in turn, is drivingly connected with a carrier assembly 128 for a conventional differential gear assembly 130. The differential gear assembly 130 has a pair of power output shafts 132, 134 which are disposed to provide a drive connection to the vehicle wheels.

Figure 2:
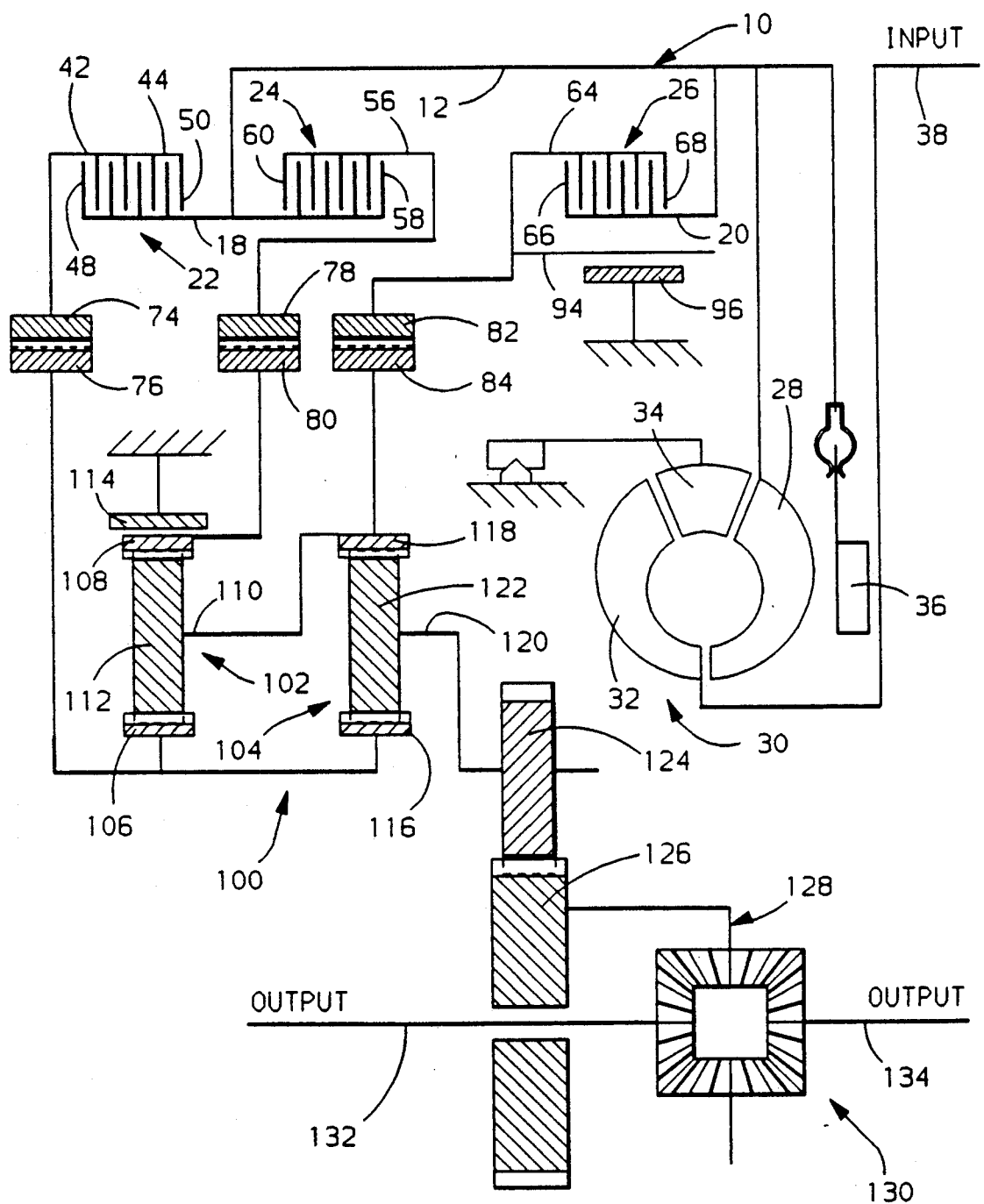
FIG. 2 is a schematic representation of the gearing embodiment shown in FIG. 1.

The main components of the gearing arrangement of FIG. 1 are shown schematically in FIG. 2. It is believed that for the following description of operation, the power flows will be more readily apparent while viewing the schematic representation of FIG. 2.

The friction clutch assemblies 22, 24 and 26 and the band brakes 96 and 114 are preferably of the fluid operated type, the design and construction of which are well known in the art. Those familiar with power transmissions are aware that these devices can be selectively engaged and disengaged hydraulically during transmission operation. In the present transmission, when the clutch assembly 22 is engaged, input power delivered through the torque converter and clutch 30 will be directed to the transfer gear set 74, 76 and therefore the sun gears 106 and 116. When the clutch assembly 24 is engaged, input power from the torque converter and clutch 30 will be directed to the transfer gear set 78, 80 and therefore the ring gear 108. When the clutch assembly 26 is engaged, input power from the torque converter and clutch 30 will be delivered to the transfer gear set 82, 84 and therefore the interconnected ring gear 118 and carrier 110.

When the brake 96 is engaged, the transfer gear set 82, 84 and the interconnected ring gear 118 and carrier 110 will be held stationary. When the brake 114 is engaged, the ring gear 108 will be held stationary. The simultaneous engagement of clutch assembly 26 and brake 96 is not permitted and the simultaneous engagement of clutch 24 and brake 114 is not permitted. Obviously, the simultaneous engagement of these pairs of devices will cause stalling of the engine or undue stress will be generated within the gear sets. The prevention of such simultaneous engagement can be provided through the use of conventionally known and utilized hydraulic control systems.

To establish the first forward and lowest drive ratio within the transmission, the brake 96 is engaged and the clutch assembly 22 is engaged. This will cause the rotation of the sun gears 106 and 116 at a speed proportional to the speed of input shaft 12 as modified by the gear ratio present in the transfer gear set 74, 76. With the brake 96 engaged, the ring gear 118 is stationary and therefore the carrier 120 is driven in the same direction as the sun gear 116 at a reduced speed ratio determined by the ratio established in the planetary gear set 104. Therefore, the overall first ratio is determined by the transfer gear set 74, 76 and planetary gear set 104.

To establish the second forward speed ratio, clutch assembly 22 remains engaged and the brake 96 is disengaged while the brake 114 is engaged. With the brake 114 engaged, the ring gear 108 is held stationary so that the carrier 110 is driven forward at a speed proportional to the ratio of the planetary gear set 102. The speed of carrier 120 is affected by the forward rotation of the carrier 110 such that the output speed of the transmission increases for a given input speed. During operation in the second forward speed ratio, the overall transmission ratio is determined by the gear ratio of transfer gears 74, 76, planetary set 102 and planetary set 104.

To establish the third forward speed ratio, clutch assembly 22 remains engaged and the brake 114 is disengaged while the clutch assembly 24 is engaged. With the clutch assembly 24 engaged, the ring gear 108 will be driven forwardly, the same direction as the sun gear 106, at a speed proportional to the gear ratio established in the transfer set 78 and 80. The forward rotation of ring gear 108 will cause an increase in the speed of the carrier 110 for a given input speed and likewise an increase in the speed of carrier 120. In the third forward ratio, the overall transmission ratio is determined by the transfer gear set 74, 76, the transfer gear set 78, 80, the planetary gear set 102 and the planetary gear set 104.

To establish a fourth gear ratio, the clutch assembly 22 remains engaged and the clutch assembly 24 is disengaged while the clutch assembly 26 is engaged. With the clutch 26 engaged, the ring gear 118 rotates forwardly at a speed proportional to the input shaft 12 as modified by the ratio of the transfer gear set 82, 84. With both the clutch assembly 24 and brake 114 disengaged, the ring gear 108 is free to rotate and therefore will not provide either a reaction or an input to the planetary arrangement 100 during the fourth ratio. The overall transmission ratio in the fourth forward speed is determined by the transfer gear set 74, 76, the transfer gear set 82, 84 and the planetary gear set 104.

To establish the fifth forward speed ratio, the clutch assembly 24 remains engaged and the clutch assembly 22 is disengaged while the clutch assembly 26 is engaged. With the clutch assemblies 24 and 26 engaged, the ring gears 108, 118 and carrier 110 are driven at speeds proportional to the speed of input shaft 12 as modified by the ratios of the respective transfer gear sets 78, 80 and 82, 84. With both the ring gears 108 and 118 and carrier 110 driven in the forward direction, the carrier 120 will be driven in the forward direction at a speed proportional to the speed of input shaft 12 as modified by the gear ratios of the transfer gear sets 78, 80 and transfer gear sets 82, 84, the planetary gear set 102 and the planetary gear set 104.

To establish the sixth and highest forward speed ratio, the clutch assembly 26 remains engaged and the clutch assembly 24 is disengaged while the brake 114 is engaged. This establishes the ring gear 108 as the reaction member in the planetary gear set 102. With the ring gear 108 held stationary and the carrier 110 driven in the forward direction, the sun gears 106 and 116 will also be driven in the forward direction in an overdrive condition. Since both the ring gear 118 and sun gear 116 are driven in the forward direction, the carrier 120 will likewise be driven in the forward direction. The overall transmission ratio in the sixth forward speed ratio is determined by the gear ratio of the transfer gear set 82, 84, the planetary gear set 102 and the planetary gear set 104.

A reverse speed ratio is established in the transmission by engaging the clutch assembly 24 and the brake 96 while the remaining friction devices are disengaged. The brake 96 will maintain the ring gear 118 and the carrier 110 stationary while the clutch 24 will cause forward rotation of the ring gear 108. With the carrier 110 stationary, the sun gear 106 will rotate in a reverse direction as will the sun gear 116. With the ring gear 118 held stationary and the sun gear 116 rotating in the reverse direction, the carrier 120 will rotate in the reverse direction at a reduced speed. The overall transmission ratio in reverse is determined by the gear ratio of the transfer gears 78, 80, the planetary gear set 102 and the planetary gear set 104.

From the foregoing description of operation, it should now be appreciated that the transfer gears 74, 76 have an effect on the overall transmission ratio in the first, second, third and fourth forward speed ratios. The transfer gears 78, 80 have an effect on the overall transmission speed ratio in the third and fifth forward speed ratio and the reverse speed ratio. The transfer gear set 82, 84 have an effect on the transmission ratio in the fourth, fifth and sixth forward speed ratios. Thus, by changing the transfer gear ratios, the overall transmission ratios can be changed or modified to suit a particular transmission use. Therefore, in most transmission applications, the same planetary gear sets can be used while many different overall transmission ratios are established in the transmission arrangements.

The following chart provides one set of gear teeth and ratios that are possible with the present invention. It should be noted that the transfer gear pairs 74-76, 78-80, 82-84 have different pitch values to accommodate the required number of teeth to provide the desired ratios.

| Gear No. | Number of Teeth | Ratio Number | Ratio Value w/Final Drive |
|---|---|---|---|
| 74 | 100 | 1st | 11.996 |
| 76 | 110 | 2nd | 7.261 |
| 78 | 90 | 3rd | 4.536 |
| 80 | 122 | 4th | 3.810 |
| 82 | 100 | 5th | 3.059 |
| 84 | 96 | 6th | 2.204 |
| 106 | 48 | Rev | −7.884 |
| 108 | 90 | | |
| 116 | 48 | Ratio Number | Ratio Value w/o Final Drive |
| 118 | 90 | | |
| 124 | 29 | 1st | 3.163 |
| 126 | 110 | 2nd | 1.915 |
| | | 3rd | 1.196 |
| | | 4th | 1.004 |
| | | 5th | .806 |
| | | 6th | .581 |
| | | Rev | −2.079 |

It is well known that planetary gear arrangements are more expensive to manufacture than conventional spur gears or helical gears which are utilized in the transfer gear sets. Therefore, the cost of providing for a plurality of transmission ratio configurations for differing vehicles can be maintained at a low cost level by utilizing the advantages of the present invention.

The embodiments of the invention in which an exclusive property or privilege is claimed are defined as follows:

1. A power transmission comprising: input means; first, second and third transfer gear means; first, second and third selectively engageable clutch means for selectively drivingly connecting said first, second and third transfer gear means with said input means; output means; first planetary gear means having a first member connected with said first transfer gear means, a second member connected with said third transfer gear means and a third member; second planetary gear means having a first member connected with said first transfer gear means and said first member of said first planetary gear means, a second member connected with said second transfer gear means and with said third member of said first planetary gear means and a third member connected with said output means; first selectively operable brake means for restricting rotation of said second member of said first planetary gear means; and second selectively operable brake means for restricting rotation of said second member of said second planetary gear means; whereby said first, second and third clutch means and said first and second brake means are controlled to establish six forward speed ratios and one reverse speed ratio between said input means and said output means.

2. A power transmission comprising: input means for delivering power to said transmission; output means for delivering power from said transmission; first planetary gear means; second planetary gear means, said first and second planetary gear means having first interconnected members and second interconnected members, one of said planetary gear means having a member connected with said output means; a plurality of input gear means selectively connectable between said input means and said first interconnected members, said second interconnected members and another member of the other of said planetary gear means respectively for providing selective gear ratios therebetween; a plurality of clutch means for selectively operatively connecting said input means with respective ones of said input gear means; and a plurality brake means for selectively restricting rotation of one of said interconnected members and said another member; whereby a plurality of forward drive ratios and a reverse ratio are establishable between said input means and said output means.

3. The invention defined in claim 2 wherein the plurality of forward drive ratios is one greater than the sum of the plurality of clutch means and the plurality of brake means.

* * * * *